United States Patent
Resnick

(10) Patent No.: US 10,526,146 B1
(45) Date of Patent: Jan. 7, 2020

(54) MATERIAL HANDLING SYSTEM AND ARTICLE TRANSFER

(71) Applicant: Intelligrated Headquarters, LLC, Mason, OH (US)

(72) Inventor: Brian John Resnick, Mason, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/124,771

(22) Filed: Sep. 7, 2018

(51) Int. Cl.
| | |
|---|---|
| *B65G 17/06* | (2006.01) |
| *B65G 47/64* | (2006.01) |
| *B65G 35/06* | (2006.01) |
| *B65G 17/34* | (2006.01) |
| *B65G 47/94* | (2006.01) |

(52) U.S. Cl.
CPC ......... *B65G 17/066* (2013.01); *B65G 17/345* (2013.01); *B65G 35/06* (2013.01); *B65G 47/64* (2013.01); *B65G 47/945* (2013.01); *B65G 2203/0216* (2013.01); *B65G 2203/0233* (2013.01); *B65G 2203/044* (2013.01); *B65G 2811/095* (2013.01)

(58) Field of Classification Search
CPC ................ B65G 17/345; B65G 47/945; B65G 2203/0233; B65G 2203/044; B65G 2811/095; B65G 35/06; B65G 47/64; B65G 17/06

USPC .................................................... 198/370.06
See application file for complete search history.

(56) References Cited

U.S. PATENT DOCUMENTS

| | | |
|---|---|---|
| 3,905,491 A | 9/1975 | Harrison |
| 5,353,912 A | 10/1994 | Killer et al. |
| 5,588,520 A * | 12/1996 | Affaticati ............... B61B 13/08 198/370.06 |
| 6,246,023 B1 | 6/2001 | Kugle |
| 6,644,458 B1 | 11/2003 | Edsley-Christensen |
| 2007/0203612 A1* | 8/2007 | Mileaf ..................... B07C 3/08 700/216 |
| 2010/0089274 A1* | 4/2010 | Austin ................ B65G 17/345 104/118 |
| 2017/0158435 A1* | 6/2017 | Wiesmann ............... B07C 5/36 |

* cited by examiner

*Primary Examiner* — Mark A Deuble
(74) *Attorney, Agent, or Firm* — Alston & Bird LLP

(57) ABSTRACT

Various embodiments described herein relate to a material handling system including a first conveyor and a second conveyor positioned such that a curved section of the second conveyor is substantially concentric with a curved section of the first conveyor. The speed of the first conveyor and the second conveyor are matched such that a loaded cross belt carriage may transfer an article on to an empty cross belt carriage at the curved sections of the first conveyor and the second conveyor. The speed of the first conveyor and the second conveyor are matched using a speed matching routine executed by a central controller such that the transfer of the article is facilitated at the curved sections of the first conveyor and the second conveyor.

20 Claims, 7 Drawing Sheets

MATERIAL HANDLING SYSTEM AND ARTICLE TRANSFER

TECHNICAL FIELD

The present disclosure relates generally to material handling systems, and, more specifically, to controlling the transfer of articles between conveyors.

BACKGROUND

In material handling environments, multiple conveyors may be arranged in a closed loop for transporting articles from one place to another. These articles may be consumer goods, packaged boxes, cases, items, cartons, and/or like and may be transported by conveyors from a source location to a destination location. For example, a source location may correspond to a warehouse, inbound container dock, pickup area, inventory, storage facility, induction station, or another conveyor, and the destination location may correspond to a cubby, pallet, chute, put wall, staging area, and/or outbound container dock. Sortation systems may also be used in these environments and may sort or otherwise direct articles to their destination location. These conveyor systems may further include straight sections and curved sections that may be under-utilized during the sortation process.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

BRIEF SUMMARY

Figure 1:
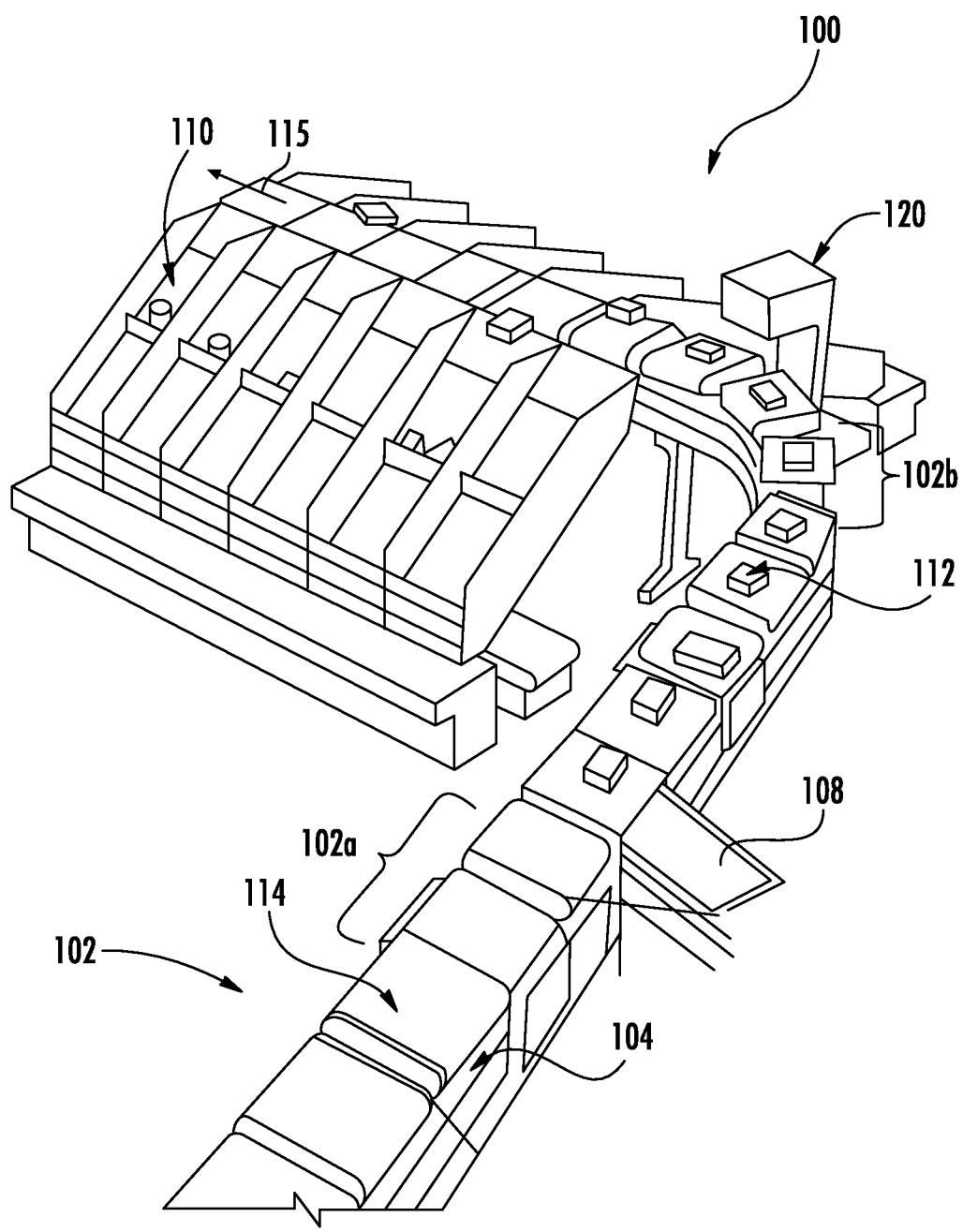
FIG. 1 illustrates a perspective view of a material handling system that includes a loop sorter having an induction station installed on straight sections of the loop sorter according to an example embodiment.

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

Various aspects described herein, with reference to the claimed system, relate to a material handling system including a first conveyor and a second conveyor. The first conveyor may include a first set of cross belt carriages and the second conveyor may include a second set of cross belt carriages positioned adjacent the first set of cross belt carriages. A curved portion of the second conveyor may be substantially concentric with a curved portion of the first conveyor. Further, the material handling system may include a controller in communication with the first conveyor and the second conveyor. The controller may be configured to receive a constant velocity (Vs) of the first set of cross belt carriages from a first sensor of the first conveyor and a first input signal from a second sensor of the first conveyor. The first input may be indicative of an empty cross belt carriage from among the first set of cross belt carriages at an upstream location. The controller may be further configured to receive a second input signal from a third sensor of the second conveyor. The second input signal may be indicative of a loaded cross belt carriage from among the second set of cross belt carriages located at an induction location on the second conveyor. The controller may further determine a first time period (T1) for the empty cross belt carriage to travel from the upstream location to a common location on the curved portions of the first conveyor and the second conveyor. The common location may be determined based on a radius of the curved portions of the first conveyor and the second conveyor. The controller may determine an angular velocity (Vc) of the loaded cross belt carriage based on the constant velocity (Vs) and the radius of the curved portions of the first conveyor and the second conveyor. Further, the controller may determine a second time period (T2) for the loaded cross belt carriage to travel from the induction location to the common location based on the angular velocity (Vc) and the constant velocity (Vs). In an instance in which the first time period (T1) and the second time period (T2) are within an accepted tolerance level, the controller may be configured to cause the loaded cross belt carriage to accelerate to the angular velocity (Vc) in order to reach the common location within the second time period (T2) and further cause the empty cross belt carriage to travel at the constant velocity (Vs) in order to reach the common location within the first time period (T1). In an instance in which the loaded cross belt carriage and the empty cross belt carriage reach the common location, the controller may be configured to initiate a transfer of an article from the loaded cross belt carriage to the empty cross belt carriage at the common location and receive an indication signal from a fourth sensor upon transfer of the article. The indication signal may be indicative of one of a successful or unsuccessful transfer of the article.

Various aspects described herein relate to a material handling system including a controller configured to determine the angular velocity (Vc) of the loaded cross belt carriage as function of constant velocity (Vs), radius of the first conveyor, and the radius of the second conveyor.

Various aspects described herein relate to a material handling system including a controller configured to determine a first time period (T1) of the empty cross belt carriage as a function of constant velocity distance (Ds) and the constant velocity (Vs). Further, the constant velocity distance (Ds) may be calculated as a function of Actual distance (D) and the Distance traveled by the empty cross belt carriage (D'). The Actual distance (D) may be a distance between the upstream location and the common location. The Distance traveled by the empty cross belt carriage (D') may be the distance traversed by the empty cross belt carriage at (Vs) after passing the upstream location.

Various aspects described herein relate to a material handling system including a controller configured to determine a second time period (T2) of the loaded cross belt carriage as a function of acceleration time (Tc) and constant velocity travel time (Ts). The constant velocity travel time (Ts) may be a function of constant velocity distance (Ds) and the constant velocity (Vs). The acceleration time (Tc) may be a function of linear rate of acceleration (ACC), initial velocity (V initial) and final velocity (V final). The constant velocity distance (Ds) may be a function of Actual Distance (D) and the Distance traveled by the loaded cross belt carriage (D'). For a linear rate of acceleration (ACC) from initial velocity (V initial) to final velocity (V final), the Distance traveled by the loaded cross belt carriage (D') may be a function of the linear rate of acceleration (ACC), the initial velocity (V initial), and the final velocity (V final). The Actual Distance (D) may be a distance between the induction location and the common location. The Distance traveled by the loaded cross belt carriage (D') may be the distance traversed by the loaded cross belt carriage after passing the induction location.

Various aspects described herein relate to a material handling system including a loop sorter as the first conveyor and a looped induction conveyor with switchyard type induction stations as the second conveyor.

Various aspects described herein relate to a material handling system including induction stations that receive one of the empty cross belt carriage or the loaded cross belt carriage of the second conveyor.

Various aspects described herein relate to a material handling system including a controller configured to assign one or more cross belt carriages from the second set of cross belt carriages to each of the induction stations such that the second set of cross belt carriages are loaded with articles. The velocity of the one or more cross belt carriages at the induction stations may be approximately zero.

Various aspects described herein relate to a material handling system including induction stations that include robotic induction stations, operator induction stations, and conveyor merge induction stations.

Various aspects described herein relate to a material handling system including the first sensor which is one of a motion detector, encoder, or resolver.

Various aspects described herein relate to a material handling system where the second sensor, the third sensor, and/or the fourth sensor are one of a photo eye sensor, a laser sensor, or a camera.

Various aspects described herein relate to a material handling system having a controller configured to determine whether the first time period (T1) and the second time period (T2) are within an accepted tolerance level. The accepted tolerance level may be calculated based on a difference between the first time period and the second time period and may range from 0 to 100 milliseconds.

Various aspects described herein relate to a material handling system having a controller configured to determine whether the difference exceeds the accepted tolerance level, and compute an alignment error between the loaded cross belt carriage and the empty cross belt carriage. The alignment error may be calculated as a function of the first time period (T1), the second time period (T21), and the constant velocity (Vs).

Various aspects described herein relate to a material handling system having a controller configured to determine whether the difference exceeds the accepted tolerance level or the alignment error exceeds a threshold level. The controller may be configured to transmit a command signal to the loaded cross belt carriage of the second conveyor to abort the transfer of the article and gradually decelerate to zero and await another empty carriage on the loop sorter.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

DETAILED DESCRIPTION

In sortation systems, such as loop sorters, sortation devices (e.g., tilt trays, cross belts or the like) may be used for transporting articles from induction stations to their respective discharge stations. In some instances, the sortation devices on the loop sorters traverse a closed loop path that may include straight sections and curved sections. When operating a loop sorter, straight sections of the conveyor are utilized for installing the induction stations and the discharge stations. In this way, the curved sections of the loop sorters generally represent wasted space in the system given that induction stations and discharge stations are not installed at these sections.

Furthermore, any installation of discharge stations at the curved sections may involve computational overhead in trajectory planning for discharging the articles accurately in their discharge chutes. Said differently, given the operating speed of a loop sorter, it is possible that the installation of a discharge station at a curve section may result in the flinging of an article outside the discharge chute when attempting to discharge the article. Installing an existing style straight conveyor induction station at the curved sections is a physical impracticality because the trajectory imparted on the article by the induction station is a straight line, the trajectory of the receiving carrier is a curve, and the resulting intersection is a point. As such, given that the transfer of the article requires a certain amount of time during which the two trajectories must coincide (e.g., cannot occur instantaneously), the induction trajectory must also be curved.

In order to overcome the limitations of conventional sortation systems described above and others, the present disclosure provides a material handling system that includes two conveyors to efficiently transfer articles. A cross-belt loop sorter may be used as a first conveyor, and a second conveyor with a second set of cross belt carriages positioned adjacent to the first set of cross belt carriages may also be used. The second conveyor may be a looped induction conveyor with switchyard type induction stations. The first conveyor and the second conveyor may be positioned such that a curved section of the second conveyor is substantially concentric with a curved section of the first conveyor. An operating speed of the first conveyor and the second conveyor are matched such that a loaded cross belt carriage from among the second set of cross belt carriages transfers an article to an empty cross belt carriage from among the first set of cross belt carriage at the curved sections of the first conveyor and the second conveyor. The empty cross belt carriage is configured to receive an article from the loaded cross belt carriage as the empty cross belt carriage traverses the curved section of the loop sorter. Similarly, the loaded cross belt carriage is configured to transfer the article to the empty cross belt carriage at the curved section of the loop sorter. In this way, the curved section of the loop sorter is utilized for transfer or induction of articles.

The operating speed of the first conveyor and the second conveyor are matched using a speed matching routine executed by a controller of the material handling system such that the transfer of the article at the curved section remains smooth (i.e., without the need for any additional discharge trajectory planning). In this way, computational overhead for the discharge trajectory planning is reduced, and give that there is only one looped induction conveyor belt with multiple induction stations, the need for installation of additional induction belts and induction stations with multiple scanners is obviated. Furthermore, processing time of the system may be reduced as the looped induction conveyor includes a single scanner device common to the multiple induction station provided in a switchyard type arrangement. Moving the induction to the curved sections allows the straight section space previously used for inductions to be used for discharges. As such, the same size system may have more discharge stations, or a system with the same quantity of discharges will have a smaller footprint utilizing induction on a curve.

According to an example embodiment, the articles that are transferred from the second set of cross belt carriages of the looped induction conveyor to the first set of cross belt carriages of the loop sorter at the curved sections may be discharged back to the second set of cross belt carriages at the curved sections. In this regard, an operational flexibility is provided to the material handling system to transfer the article back into the looped induction conveyor (e.g., in the case of a discharge failure). In other example embodiments, the articles that are transferred from the second set of cross belt carriages of the looped induction conveyor to the first set of cross belt carriages of the loop sorter at the curved sections may be retracted to the second set of cross belt carriages at the curved sections (e.g., in the case of an induction failure).

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical, and other changes may be made without departing from general scope of the disclosure. The following detailed description is, therefore, not to be taken in a limiting sense, and the scope of the present disclosure is defined by the appended claims and equivalents thereof. Furthermore, the material handling system of the present disclosure is described hereafter with reference to a loop sorter. However, the present disclosure contemplates that the embodiments described herein may be equally applicable to other types of sorting systems, devices, and the like.

As used herein, the term "angular velocity (Vc)" refers to a speed-match velocity or transfer speed match velocity of second set of cross belt carriages of the looped induction conveyor.

With reference to FIG. 1, a perspective view of a material handling system that includes a loop sorter having an induction station installed on straight sections of the loop sorter is illustrated. The material handling system includes a first conveyor 102. The first conveyor 102, in some embodiments, is a loop sorter. The loop sorter 102 may sort a wide variety of articles such as parcels, polybags, etc. As shown in FIG. 1, the loop sorter 102 may be a cross belt loop sorter traversing a continuous closed loop path. The cross belt loop sorter includes a set of cross belt carriages 114. The set of cross belt carriages 114 are configured to carry and discharge articles 112. The loop sorter 102 may further include an induction conveyor 108, conveyor bed or track 104, an indicia reader 120, and discharge chutes 110. The induction conveyor 108 may transfer articles 112 to respective cross belt carriages 114 on the loop sorter 102 (e.g., such as in the inbound direction indicated by arrow 115). The induction conveyor 108 is installed in a straight section 102a of the loop sorter 102. Further, the induction conveyor 108 may include one or more indicia readers (not shown) to read the indicia affixed to the article 112 before inducting it on to a designated cross belt carriage 114.

Articles 112 may be deposited from the induction conveyor 108 on the designated cross belt carriage supported by a cross belt carrier cart (not shown). A train of cross belt carrier carts (not shown) may be endlessly conveyed on the conveyor bed or track 104 in a looping direction indicated by arrow 115. Confirmation of identity and position of articles on the cross belt carriages 114 may be performed by the indicia reader 120 via optical character recognition (OCR), linear or two-dimensional barcode reading, dimensioning, multiple article detection, or the like. Once the identity and dimensions of the articles 112 are confirmed, and in response to articles 112 being assigned to the discharge chute 110, the loop sorter 102 may discharge the articles 112 into the discharge chutes 110. The articles 112 inducted at the straight section 102a at one end of the loop sorter 102 travel through the curved section 102b and then are discharged on the discharge chutes 110 located on the straight line section 102a at another end of the loop sorter 102. In this regard, after induction of articles 112 at one end of the loop sorter, the articles 112 travel a distance approximately equal to the full length of the loop sorter 102 and are then discharged at the other end of the loop sorter 102. Therefore, there exists a need to utilize the under-utilized sections of the loop sorter 102 to efficiently and effectively induct and discharge the articles 112 during the sortation process in a short span of time.

Figure 2:
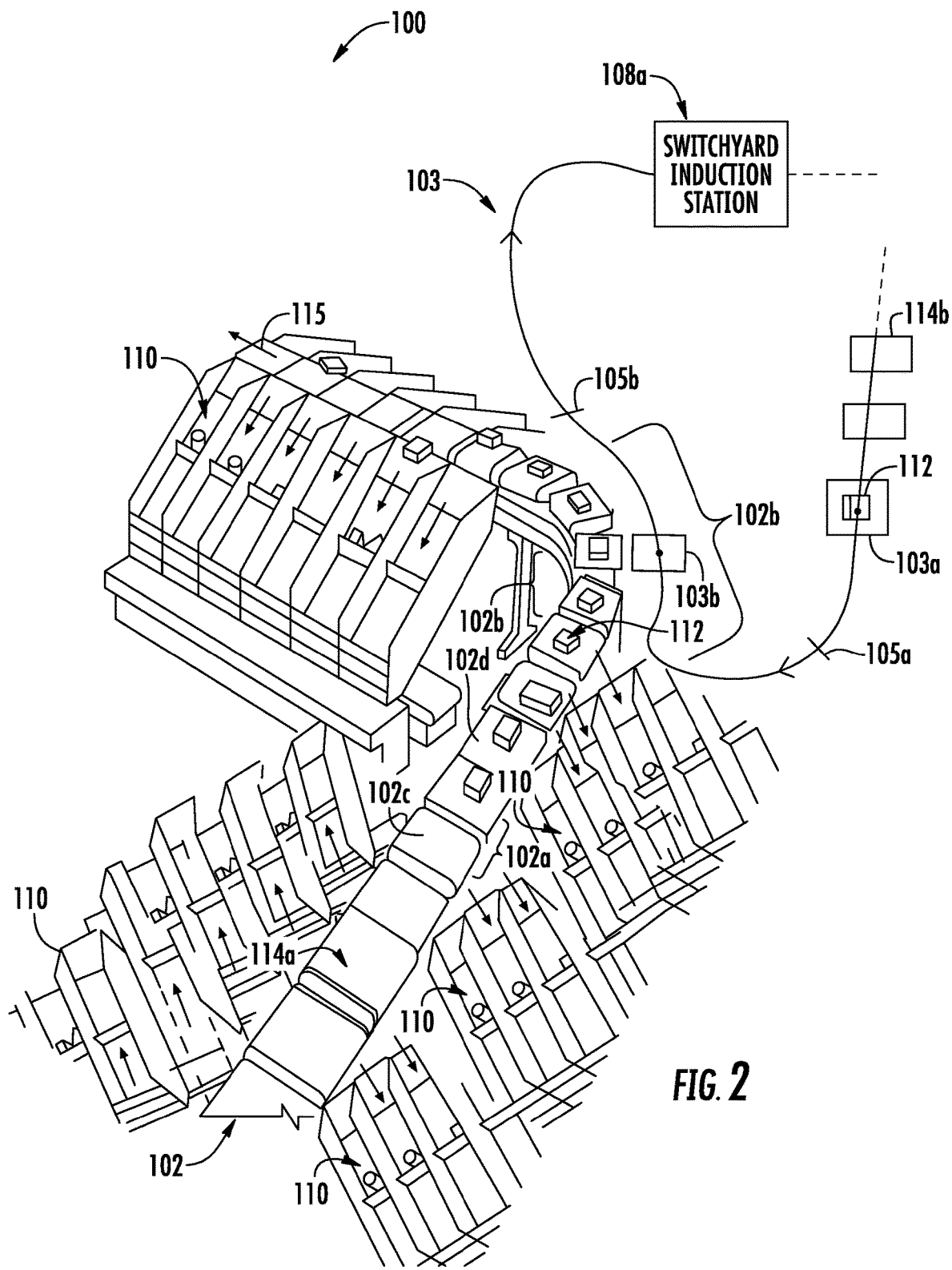
FIG. 2 illustrates a perspective view of a material handling system that includes a loop sorter having a looped induction conveyor installed on curved sections of the loop sorter according to an example embodiment.
Figure 5:
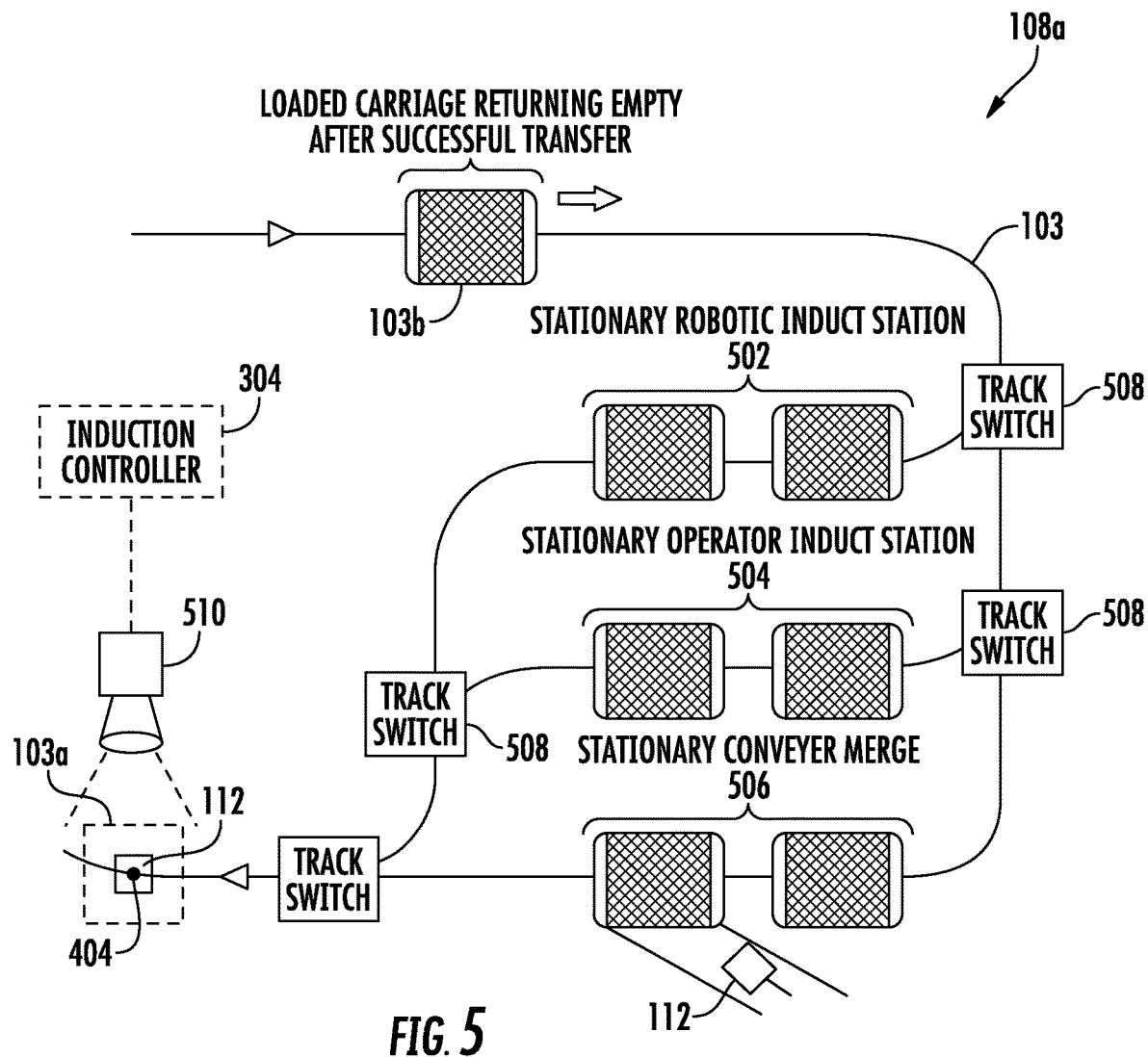
FIG. 5 illustrates a diagrammatic plan view of switchyard type induction stations of the looped induction conveyor of FIG. 2 according to an example embodiment.

With reference to FIG. 2, a perspective view of a material handling system that includes a loop sorter having a looped induction conveyor installed on curved sections of the loop sorter is illustrated. The material handling system 100 includes a first conveyor 102 and a second conveyor 103. The first conveyor 102 and the second conveyor 103 are positioned such that the curved section 102b of the second conveyor 103 is substantially concentric with the curved section 102b of the first conveyor 102. The first conveyor 102, for example, is a loop sorter. The loop sorter 102 may sort a wide variety of articles 112 such as parcels, polybags, etc. As above, the loop sorter 102 may be depicted as cross belt loop sorter traversing a continuous closed loop path. The cross belt loop sorter 102 includes a first set of cross belt carriages 114a. The first set of cross belt carriages 114a are capable of carrying and discharging articles 112 onto discharge chutes 110. The second conveyor 103 is a looped induction conveyor. The loop induction conveyor includes switchyard type induction stations 108a as shown in FIG. 5.

The looped induction conveyor 103 includes a second set of cross belt carriages 114b. The second set of cross belt carriages 114b are capable of carrying and transferring/inducting articles 112 to the first set of cross belt carriages 114a. Further, the looped induction conveyor 103 may include at least one indicia reader (not shown) to read the indicia affixed to the article 112 before inducting or transferring the article to a designated cross belt carriage from among the first set of cross belt carriages 114a.

In FIG. 2, the loop induction conveyor 103 is shown having two cross belt carriages from among the second set of cross belt carriages 114b. One of the cross belt carriages is an empty cross belt carriage 103b and the other is a loaded cross belt carriage 103a. The empty cross belt carriage 103b indicates that the article 112 has been transferred to a designated cross belt carriage 114a of the first set of cross belt carriages 114a. The loaded cross belt carriage 103a indicates that the article 112 is yet to be transferred to the first set of cross belt carriages 114a. In an example embodiment, the loaded cross belt carriage 103a supporting the article 112 travels through path 105a and discharges or transfers the article 112 to the designated cross belt carriage 114a. The empty cross belt carriage 103b is shown following transfer of the article 112 to the designated cross belt carriage. The empty cross belt carriage 103b traces the path 105b to reach to the switchyard type induction station in order to refill the empty cross belt carriage 103b with articles 112 such that the empty cross belt carriage 103b transforms into a loaded cross belt carriage 103a carrying article 112 to be discharged on to the loop sorter 102.

The loop sorter 102 and the looped induction conveyor 103 are speed matched such that the loaded cross belt carriage 103a from among the second set of cross belt carriages 114b transfers an article to the designated cross belt carriage of the first set of cross belt carriage 114a at the curved sections 102b of the loop sorter 102 and the looped induction conveyor 103. Following successful transfer, the loaded cross belt carriage 103a returns back as empty cross belt carriage 103b to the switchyard type induction stations 108a to be loaded again with articles 112. The speed of the loop sorter 102 and the looped induction conveyor 103 is matched using a speed matching routine executed by a controller of the loop sorter 102 as described hereafter with reference to FIG. 3.

As shown in FIG. 2, inducting the articles 112 on the curved sections 102b of the loop sorter 102 by means of the looped induction conveyor 103 creates addition space on the straight sections 102a of the loop sorter 102. This space may be used to accommodate additional discharge chutes such that the articles 112 may be discharged at the straight sections 102a instead of travelling a full length of the loop sorter 102 to be discharged.

Figure 3:
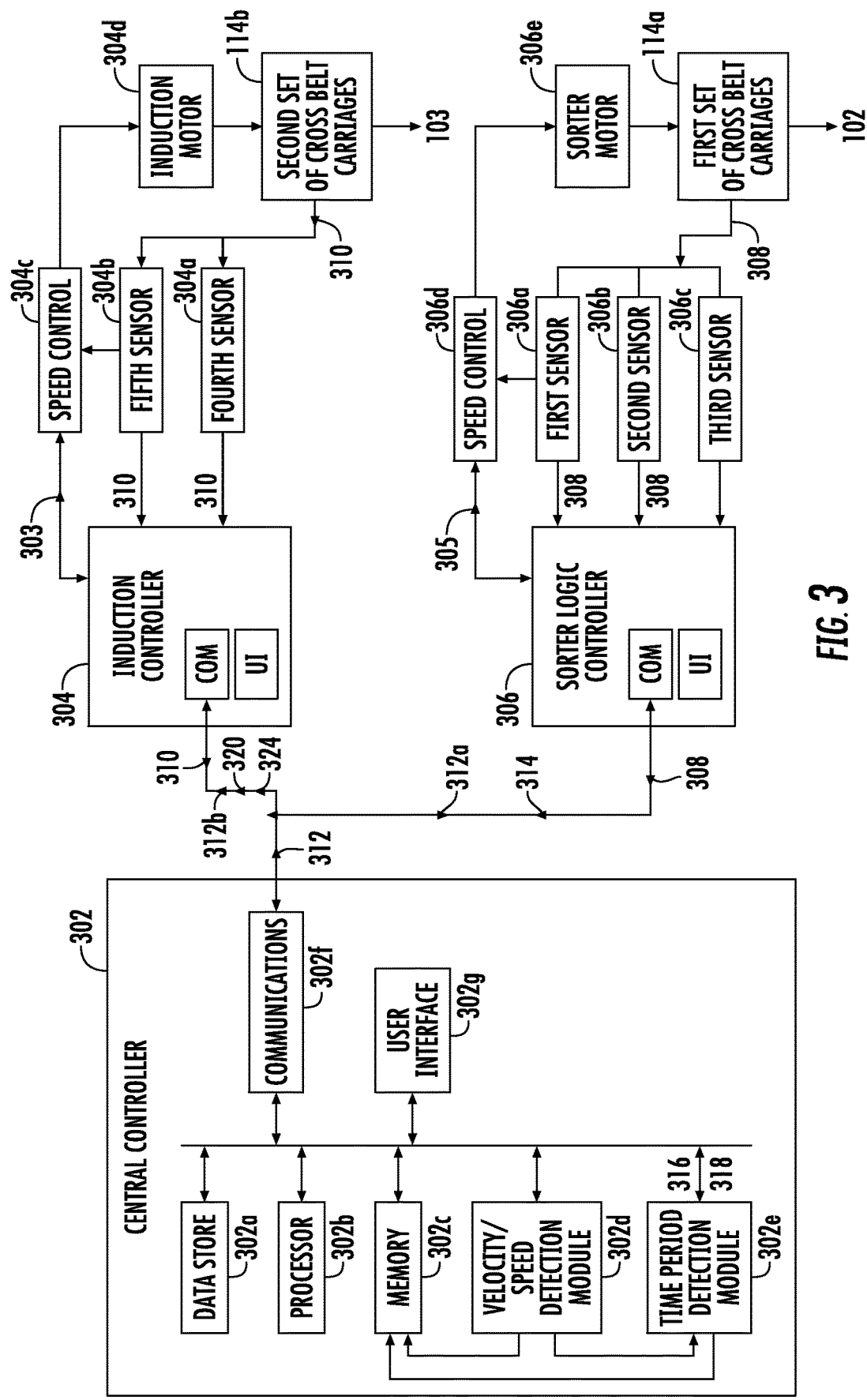
FIG. 3 illustrates a schematic block diagram of the material handling system of FIG. 2 according to an example embodiment.

With reference to FIG. 3, a schematic block diagram of the material handling system of FIG. 2 is illustrated according to an example embodiment. As shown in FIG. 3, a central controller 302 includes a velocity/speed detection module 302d and a time period detection module 302e to provide required speed matching for the set of cross belt carriages 114a, 114b of the first conveyor 102 and the second conveyor 103.

The first conveyor 102, for example, is a loop sorter. The loop sorter 102 includes a first set of cross belt carriages 114a, a first sensor 306a, a second sensor 306b, a third sensor 306c, a speed controller 306d, a sorter motor 306e, and a sorter logic controller 306. For the purpose of simplicity, the loop sorter 102 is shown having three sensors, however, the present disclosure contemplates arrangements in which the loop sorter 102 has more than three sensors. The first sensor 306a, the second sensor 306b, and the third sensor 306c are communicably coupled to the loop sorter 102 such that the loop sorter 102 receives first input data signals 308 from the first set of cross belt carriages 114a. The first input data signals 308, may include an operating speed of the first set of cross belt carriages 114a, a presence of article 112 on the first set of cross belt carriages 114a, lead edge and trailing edge detection of the first set of cross belt carriages 114a. The first sensor 306a may include a motion detector, an encoder, and/or a resolver. The second sensor 306b and the third sensor 306c may include a photo eye sensor, a laser sensor, and/or a camera. The first input data signals 308 are relayed from the first sensor 306a, the second sensor 306b, and the third sensor 306c to the sorter logic controller 306. According to an example embodiment, the first sensor 306a may relay the first input data signals 308 to a speed controller 306d that may control a sorter motor 306e to control a speed of the loop sorter 102. According to another example embodiment, the first input data signals 308 for all three sensors may be relayed to the sorter logic controller 306 that, based on the received the first input data signals 308, may communicate command signals 305 to the speed controller 306d to control the speed of the loop sorter 102. Upon receiving the first input data signals 308 from the three sensors, the sorter logic controller 306 may communicate the first input data signals 308 to the central controller 302.

As shown in FIG. 3, the second conveyor 103 is a looped induction conveyor. The looped induction conveyor 103 includes second set of cross belt carriages 114b, a fourth sensor 304a, a fifth sensor 304b, an induction motor 304d, a speed controller 304c, and an induction controller 304. While the looped induction conveyor 103 is shown with two sensors for ease of description, the present disclosure contemplates arrangements in which the looped induction conveyor 103 has more than two sensors. The fourth sensor 304a and the fifth sensor 304b are communicably coupled to the looped induction conveyor 103 such that the looped induction conveyor 103 receives second input data signals 310. The second input data signals 310 may include an operating speed of the looped induction conveyor 103, a presence of article on the second set of cross belt carriages 114b, lead edge and trailing edge detection of the second set of cross belt carriages 114b. The fourth sensor 304a may include a photo eye sensor, a laser sensor, and/or a camera. The fifth sensor 304b may include a motion detector, an encoder, and/or a resolver. According to an example embodiment, the fifth sensor 304b may relay the second input data signals to the speed controller 304c that may control the induction motor 304d to control a speed of the looped induction conveyor 103. According to another example embodiment, the second input data signals 310 from the fourth and the fifth sensors 304a, 304b may be relayed to the induction controller 304 that, based on the received the second input data signals 310, may communicate command signals 303 to the speed controller 304c to control the speed of the looped induction conveyor 103. After receiving the second input data signals 310 from the fourth and the fifth sensors 304a, 304b, the induction controller 304 may communicate the second input data signals 310 to the central controller 302.

As illustrated in FIG. 3, the central controller 302 may include a data store component 302a (e.g., any suitable combination of hardware and/or software) that provides for mass storage of information, databases, and/or programs employed in connection with the embodiments described herein. For example, data store component 302a may be a data repository for applications not currently executed by processor 302b. Further, the central controller 302 may include the processor 302b that may include a single or multiple set of processors or multi-core processors, or alternatively, may be implemented as an integrated processing system and/or a distributed processing system. The central controller 302 may further include the memory 302c that may include any type of memory 302c usable by a computer, such as random access memory (RAM), read only memory (ROM), tapes, magnetic discs, optical discs, volatile memory, non-volatile memory, and any combination thereof. Furthermore, the central controller 302 may include the communication component 302f to establish and maintain communications with one or more devices (or parties) utilizing hardware, software, and services as described herein. The communication component 302f may carry communications between components on the central controller 302, as well as between the central controller 302 and external devices, such as devices located across a communications network and/or devices serially or locally connected to the central controller 302. For example, the communication component 302f may include one or more buses, depicted as the external communication bus and the internal communication bus and further may include transmit chain components and receive chain components associated with a transmitter and receiver, respectively, operable for interfacing with external devices.

The central controller 302 may include the user interface component 302g, which may be operable to receive inputs from a user of the central controller 302, and may be further operable to generate outputs for presentation to the user, such as via a visual display (e.g., LCD monitor, etc.). The user interface component may include one or more input devices, including, but not limited, to a keyboard, a number pad, a mouse, a touch-sensitive display, a navigation key, a function key, a microphone, a voice recognition component, any other mechanism capable of receiving an input from a user, or any combination thereof. Further, the user interface component 302g may include one or more output devices, including, but not limited to, a display, a speaker, a haptic feedback mechanism, a printer, any other mechanism capable of presenting an output to a user, or any combination thereof.

Further, the central controller 302 includes the velocity/speed detection module 302d that may execute a speed matching routine in order to match the operating speeds of the first conveyor 102 and the second conveyor 103 to transfer an article 112 smoothly at the curved sections 102b of the first conveyor 102 and the second conveyor 103. Further, the central controller 102 includes a time period detection module 302e that may execute a time matching routine to determine the time for individual cross belt carriages of the first set of cross belt carriages 114a and the second set of cross belt carriages 114b to reach the curved sections 102b of the first conveyor 102 and the second conveyor 103.

For example, the first input data signals 308 from the sorter logic controller 306 and the second input data signals 310 from the induction controller 304 are stored in the memory 302c of the central controller 302. The velocity/speed detection module 302d and the time period detection module 302e may access these input data signals 308, 310 from the memory 302c to execute the speed matching routine and the time matching routine. According to an embodiment, the results of execution of the speed matching routine may be utilized by the time matching routine in order to calculate the time for individual cross belt carriages to reach the curved sections 102b of the first conveyor 102 and the second conveyor 103. Therefore, the speed of travel of individual carriages and time for the individual carriages to reach the curved sections 102b are determined based on the input data signals 308, 310 in order to transfer the article smoothly from the second conveyor 103 to the first conveyor 102. The speed matching routine and the time matching routine executed by the central controller are described hereafter in conjunction with FIG. 4.

The results of the speed matching routine and the time matching routine are communicated as one or more output data signals 312 to the sorter logic controller 306 and the induction controller 304. The one or more output data signals 312 include a first speed control signal 312a communicated to the sorter logic controller 306 and a second speed control signal 312b communicated to the induction controller 304. In an example embodiment, the first speed control signal 312a is indicative of a desired constant velocity (Vs) with which the first set of cross belt carriages 114a may be operated. The first speed control signal 312a is communicated to the sorter logic controller 306 that transmits command signals 305 to the speed controller 306d to control the sorter motor 306e in order to maintain the first set of cross belt carriages 114a in the desired constant velocity (Vs). In an example embodiment, the second speed control signal 312b communicated to the induction controller 304 is indicative of an angular velocity (Vc) at which the second set of cross belt carriages 114b may be operated. The second speed control signal 312b is communicated to the induction controller 304 that transmits command signals 303 to the speed controller 304c to control the induction motor 304d in order to operate each of the second of set of cross belt carriages 114b at the angular velocity (Vc) for a particular period of time.

Figure 4:
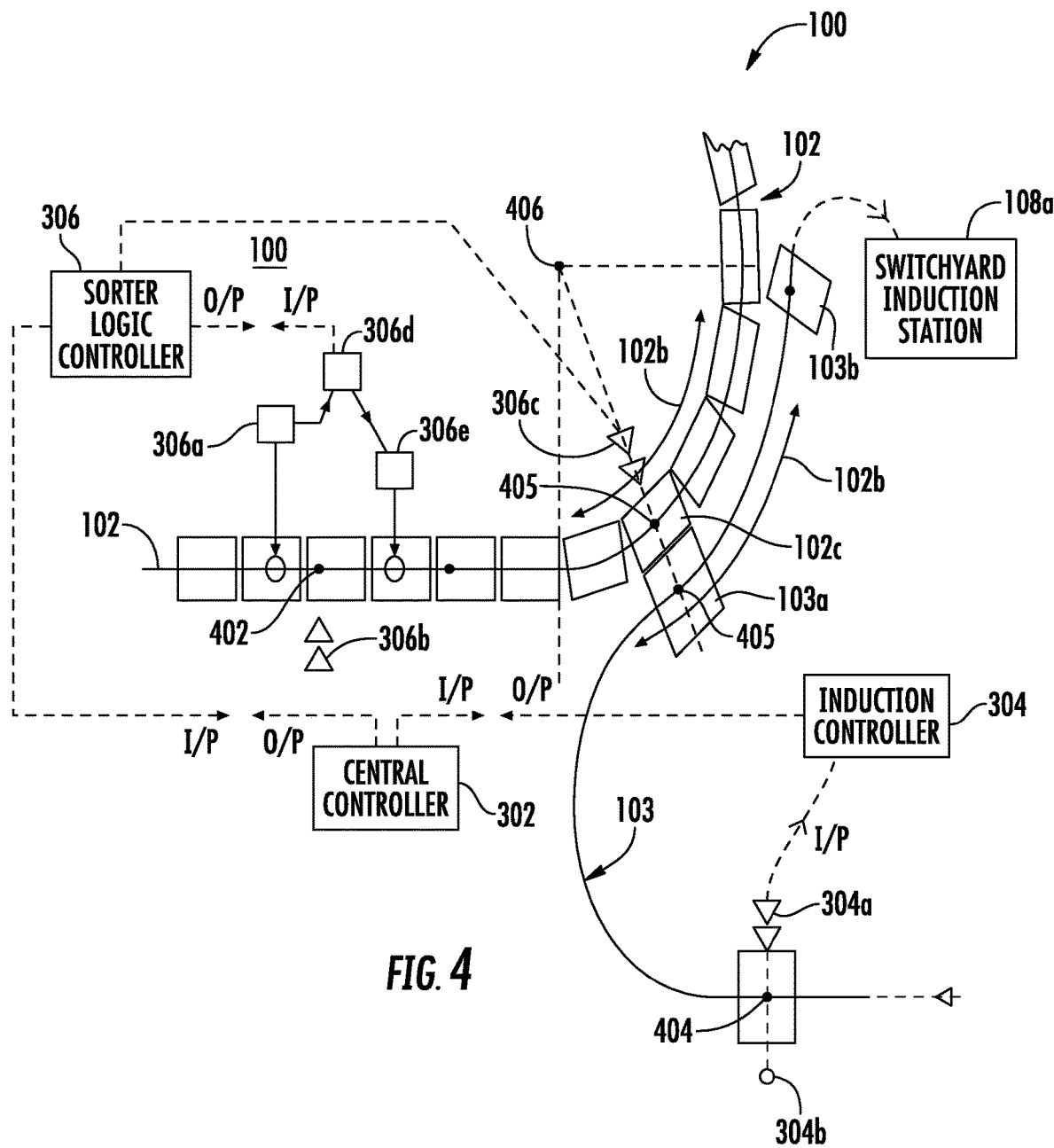
FIG. 4 illustrates a diagrammatic plan view of the material handling system of FIG. 2 depicting a portion of the loop sorter and the looped induction conveyor according to an example embodiment.

Further, the one or more output data signals 312 includes a first timing control signal 316 and a second timing control signal 318 communicated from the time period detection module 302e to the processor 302b of the central controller 302. The common location 406 (as shown in FIG. 4) on the curved sections 102b is based on the known radii of the curved sections 102b of the first conveyor 102 and the second conveyor 103 and stored in the memory 302c of the central controller 302. In FIG. 4, the empty cross belt carriage 102c and the loaded cross belt carriage 103a are shown in their first point of radial alignment 405 with the common location 406. The first timing control signal 316 is indicative of a first time period (T1) for an empty cross belt carriage 102c of the first conveyor 102 to travel from an upstream point 402 to the first point of radial alignment 405. Further, the upstream point 402 (as shown in FIG. 4) is a point at which an empty cross belt carriage 102c from among the first set of cross belt carriage 114a is detected by one or more sensors of the first conveyor 102. The second timing control signal 318 is indicative of a second time period (T2) for a loaded cross belt carriage 103a of the second conveyor 103 to travel from an induction point 404 to the first point of radial alignment 405 (as shown in FIG. 4). The induction point 404 (as shown in FIG. 4) is a point at which the angular velocity (Vc) of the loaded cross belt carriage 103a is zero or approximately zero. In an example, the induction point 404 is a point at which the second set of cross belt carriage 114b are queued in a sequence at zero velocity and waiting for the second speed control signal 312b from the central controller 102 to be accelerated to velocity (Vc).

The processor 302b of the central controller 302 upon receiving the first timing control signal 316 and the second timing control signal 318 from the time period detection module 302e determines whether the time period is within an accepted tolerance level. In an example embodiment, the processor 302b calculates a difference between the first time period and the second time period and compares it to the accepted tolerance level. When the difference is below the accepted tolerance level, then the central controller 302 issues the first speed control signal 312a and the second speed control signal 312b to the first conveyor 102 and the second conveyor 103 respectively. In such an example, the central controller 302 may only issue the second speed control signal 312b to the second conveyor 103. In another example, the central controller 302 issues a query signal to the induction controller 304 to request the current velocity of the loaded cross belt carriage 103a and the presence of the loaded cross belt carriage 103a at the induction point 404. In this regard, the central controller 302 issues the second speed control signal 312b only if the current velocity of the loaded cross belt carriage 103a is zero and is at the induction point 404.

In contrast, when the difference exceeds the accepted tolerance level, the central controller 302 refrains from sending any speed control signal to the first conveyor 102 and the second conveyor 103 until the difference in the time period is within the accepted tolerance level. According to an example embodiment, the central controller 302 may issue the first speed control signal 312a and the second speed control signal 312b even if the difference in the time period exceeds the accepted tolerance level. In this regard, the processor 302b of the central controller 302 computes an alignment error occurring at the curved section 102b between the loaded cross belt carriage 103a and the empty cross belt carriage 102c. If the computed alignment error exceeds a threshold level, then the central controller 302 issues a first command signal 320 to the induction controller 304 to abort the transfer of the article 112 from the loaded cross belt carriage 103a to the empty cross belt carriage 102c and a second command signal 324 to decelerate the loaded cross belt carriage 103a from the angular velocity (Vc) to zero until the loaded cross belt carriage 103a reaches back to the induction point 404 on the second conveyor 103. On the other hand, if the computed alignment error is below a threshold level, then the central controller 302 refrains from sending any command signal and allows the article 112 transfer to occur at the curved sections 102b.

The central controller 302 and induction controller 304 receives an indication signal 314 from the sorter logic controller 306 after successful transfer of the article 112 from the second conveyor 103 to the first conveyor 102. Once the indication signal 314 is transmitted, the sorter logic controller 306 and the induction logic controller 304 transmits the next set of input data signals 308, 310 to the central controller 302 to begin computation for speed matching. According to an example embodiment, the central controller 302 may transmit periodic request signals to the induction controller 304 and the sorter logic controller 306 for providing the next set of input data signals. According to another embodiment, the induction controller 304 and the sorter logic controller 306 may transmit the input data signals 308, 310 at periodic intervals to the central controller 302 without receiving the indication signal 314.

With reference to FIG. 4 a diagrammatic plan view of the material handling system of FIG. 2 depicting a portion of the loop sorter and the looped induction conveyor is illustrated according to an example embodiment. As shown in the FIG. 4, the material handling system 100 includes a first conveyor 102 in the form of a loop sorter and the second conveyor 103 in the form of a looped induction conveyor. In the FIG. 4, only a portion of the loop sorter 102 and the looped induction conveyor 103 is shown in order to explain in detail the transfer of articles 112 from curved sections 102b of the looped induction conveyor 103 to the curved sections 102b of the loop sorter 102. The looped induction conveyor 103 includes a switchyard type induction stations 108a which is shown in detail in FIG. 5. The loop sorter 102 includes a first sensor 306a in the form of a motion detector, encoder, or resolver; a second and third sensor 306b, 306c in the form of a photo eye sensor, laser sensor, or camera. The loop sorter 102 further includes a speed controller 306d, a sorter logic controller 306 and a sorter motor 306e in communication with the speed controller 306d as shown in FIG. 3.

In the following example, the first sensor 306a is the encoder, the second sensor 306b is the photo eye sensor, and the third sensor 306c is the camera. The encoder is communicably coupled to the speed controller 306d. The encoder, for example, may be an optical disc or magnetic disc that creates a fixed number of pulses per revolution. Real-time velocity of the loop sorter 102 may be determined by monitoring the elapsed time between the last two (2) pulses output by the encoder as the articles 112 move along with the loop sorter 102. According to another embodiment, the real-time velocity may be measured by averaging over a number of pulses, for example, average over five (5) pulses. As the loop sorter 102 increases in speed, the time between pulses transmitted decreases. As the loop sorter decreases in speed, the time between pulses increases. The speed controller 306d is configured to determine the increases and decreases in the loop sorter 102 speed based on monitoring the elapsed time between the last two pulses and/or monitoring a change in speed based on an average of several pulses. The speed controller 306d, based on monitoring the changes in speed may control the speed of the loop sorter 102, may operate the loop sorter 102 at a constant desired speed dictated by the sorter logic controller 306.

In the present example, the second sensor 306b is used to detect the leading edge of the cross belt carriage. According to another embodiment, an additional sensor (not shown) may be used along with the second sensor 306b to detect the presence of article on the cross belt carriage. For example, the additional sensor may be a photo eye sensor, for example, a photoelectric eye of either visible light, infrared light beams, or other obstruction sensing photoelectric or similar devices known to those skilled in the art. The photo eye sensor includes a photo emitter mounted to one of the side walls at the entrance at an upstream point 402 of the loop sorter 102. A reflector on the side wall opposite the photo eye reflects emitted light back to the photo eye unless the light beam is occluded by an article 112 carrying carriage entering the upstream point 402 of the loop sorter 102. According to another embodiment, any sensor capable of detecting the presence of an article 112 on a cross belt carriage of the loop sorter 102 at the upstream point 402 may also be used instead of a photo eye. For example, outputs from the second sensor 306b and the additional sensor may be used to determine whether the cross belt carriage is empty. For example, the second sensor 306b may detect the leading edge of the cross belt carriage and the additional sensor may monitor the interruptions in the light beam of the photo eye caused by the presence of the article. In the absence of any interruption in the light beam, the photo eye sensor may periodically send signals indicative of an empty cross belt carriage 102c.

In the present example, the third sensor 306c is the camera, for example, one or more cameras structured and arranged to capture an image of a portion of the loop sorter 102 at the curved section 102b. The one or more cameras are capable of generating status information associated with the portion of the loop sorter 102. According to an example embodiment, the status information may be displayed in a user interface 302g, in communication with the central controller 302, configured to display a visual representation of the status information.

The second conveyor 103 in the form of the looped induction conveyor, may include a fourth sensor 304a and a fifth sensor 304b. The fourth sensor 304a may be a photo eye sensor, laser sensor, or camera. The fifth sensor 304b may be a motion detector, encoder, or resolver. Further, the looped induction conveyor 103 includes an induction controller 304 and a speed controller 304c. The fourth sensor 304a is communicably coupled to the induction controller 304 and the fifth sensor 304b is communicably coupled to the speed controller 304c which in turn is communicably coupled to the induction controller 304 as shown in FIG. 3.

In the present example, the fourth sensor 304a is used to detect the leading edge of the cross belt carriage. According to another embodiment, an additional sensor (not shown) may be used along with the fourth sensor 304a to detect the presence of article on the cross belt carriage. For example, the additional sensor may be a photo eye sensor, for example, a photoelectric eye of either visible light, infrared light beams, or other obstruction sensing photoelectric or similar devices known to those skilled in the art. The photo eye sensor, for example, includes a photo emitter mounted to one of the side walls at an induction point 404 linking the switchyard type induction stations 108a as shown in FIG. 5. A reflector on the side wall opposite the photo eye may reflect emitted light to the photo eye unless the light beam is occluded by an article 112 carrying carriage entering the induction point 404. According to another embodiment, any sensor capable of detecting the presence of an article 112 on a cross belt carriage of the looped induction conveyor 103 at the induction point 404 may also be used instead of a photo eye. For example, outputs from the fourth sensor 304a and the additional sensor may be used to determine whether the cross belt carriage is empty or not. For example, the fourth sensor 304a may detect the leading edge of the cross belt carriage and the additional sensor may monitor the interruptions in the light beam of the photo eye caused by the presence of the article. In the absence of any interruption in the light beam, the photo eye sensor may periodically send signals indicative of an empty cross belt carriage 102c.

Further, the fifth sensor 304b may be an encoder. The encoder is communicably coupled to the speed controller. The encoder, for example, may be an optical disc or magnetic disc that creates a fixed number of pulses per revolution. Real-time velocity of the looped induction conveyor 103 may be determined by monitoring the elapsed time between the last two (2) pulses output by the encoder as the articles moves along with the looped induction conveyor 103. According to another embodiment, the real-time velocity may be measured, for example, by averaging a number of pulses, for example, average over five (5) pulses. As looped induction conveyor 103 increases in speed, the time between pulses transmitted decreases. As the looped induction conveyor 103 decreases in speed, the time between pulses increases. The speed controller 304c is able to determine the increases and decreases in the looped induction conveyor 103 speed based on monitoring the elapsed time between the last two pulses or monitoring a change in speed based on an average of several pulses. The speed controller 304c, based on monitoring the changes in speed may control the speed of the looped induction conveyor 103 may operate the looped induction conveyor 103 at a variable speed dictated by the induction controller 304.

According to another embodiment, each of the second sensor 306b and the fourth sensor 304a may include two photo eye sensors. For example, one of the photo eye sensors may detect the arrival of a cross belt carriage on the loop sorter 102 and the looped induction conveyor 103 by detecting a leading edge of the cross belt carriage or by detecting the license plate of the cross belt carriage. In an example, the two photo eye sensors may be placed in the upstream point 402 and the induction point 404 and may simultaneously communicate carriage-entry and article-entry signals to the sorter logic controller 306 and the induction controller 304 respectively.

The loop sorter 102 and the looped induction conveyor 103 are controlled by a central controller 302 that is communicably coupled with the sorter logic controller 306 and the induction controller 304 as shown in FIG. 3. The central controller 302 executes a speed matching routine and time period matching routine to speed match the loop sorter 102 with the looped induction conveyor 103 based on input data signals 308, 310 from the photo eye sensors, the encoders, and the cameras installed on both the loop sorter 102 and the looped induction conveyor 103. In FIG. 4, the speed matching occurs at the curved sections 102b of both the loop sorter 102 and the loop induction conveyor 103. The central controller 302 serves as a master control for the loop sorter 102 and looped induction conveyor 103 with sorter logic controller 306 and the induction controller 304 as slave controls.

The loop sorter 102 includes a first set of cross belt carriages 114a which includes a combination of empty cross belt carriages 102c and loaded cross belt carriages 102d (as shown in FIG. 2). In operation, the first set of cross belt carriages 114a traverses a closed loop path of the loop sorter 102. The closed loop path include straight section 102a and curved sections 102b. Each of the first set of cross belt carriages 114a is tracked by one or more sensors, for example, photo eyes, encoders, and cameras as described above. For example, the first sensor 306a determines the speed of the loop sorter 102 and the second sensor 306b senses the presence of a cross belt carriage and the additional sensor senses a presence of an empty cross belt carriage 102c at the upstream point 402 from among the first set of cross belt carriages 114a. The sensed information is then communicated to the central controller 302 as first input data signals 308 from the sorter logic controller 306.

The looped induction conveyor 103 includes a second set of cross belt carriages 114b which includes a combination of empty cross belt carriages 103b and loaded cross belt carriages 103a. In operation, the second set of cross belt carriages 114b traverses a closed loop path of the looped induction conveyor 103. The closed loop path includes switchyard type induction stations 108a as shown in FIG. 5. A portion of the curved section 102b of the looped induction conveyor 103 is substantially concentric with the curved section 102b of the loop sorter 102. Each of the second set of cross belt carriages 114b is tracked by one or more sensors, for example, photo eyes, encoders, and cameras as described above. For example, the fifth sensor 304b determines the speed of the looped induction conveyor 103 and the fourth sensor 304a senses a presence of a loaded cross belt carriage 103a at the induction point 404 from among the first set of cross belt carriages 114a. The sensed information is then communicated to the central controller 302 as second input data signals 310 from the induction controller 304.

The first data input signals 308 and the second data input signals 310 is communicated to the central controller 302. The first data input signal 308 includes a constant velocity (Vs) of the first set of cross belt carriages 114a. The second data input signal 310 includes the velocity ($V_{initial}$) of the loaded cross belt carriage 103a at the induction point 404. The first data input signal 308 further includes an indication of an empty cross belt carriage 102c at the upstream point 402. The second data input signal 310 further includes an indication of a loaded cross belt carriage 103a at the induction point 404. The upstream point 402 and the induction point 404 are predefined on the loop sorter 102 and the looped induction conveyor 103 respectively.

When the first data input signals 308 and the second data input signals 310 are communicated to the central controller 302, the central controller 302 executes a speed matching routine. The speed matching routine determines an angular velocity (Vc) for the loaded cross belt carriage 103a of the looped induction conveyor 103 based on the first data input signals 308, the second data input signals 310 and further based on the stored data in the memory 302c of the central controller 302 as shown in FIG. 3.

In the following example, the constant velocity of the loop sorter 102 from the upstream point 402 to a common location 406 is (Vs), the radius of the curved section 102b of the looped induction conveyor 103 is ($R_{induct}$), and the radius of the curved section 102b of the loop sorter 102 is ($R_{sort}$). As such, the angular velocity of the loaded cross belt carriage 103a to travel on its curved section 102b on induction conveyor 103 is given by the formula:

$Vc=(Vs*(R_{induct})\div(R_{sort})$, wherein the common location 406 is determined based on a radius of the curved sections 102b of the first conveyor 102 and the second conveyor 103.

After determining the angular velocity (Vc) for the loaded cross belt carriage 103a, the central controller 302 executes a time matching routine based on the angular velocity (Vc), the first data input signals 308, the second data input signals 310, and the stored data in the memory 302c of the central controller 302 as shown in FIG. 3. The time matching routine is executed to determine whether a first time period (T1) for the empty cross belt carriage 102c of the loop sorter 102 to travel from the upstream point 402 to the common location 406 at the constant velocity is approximately the same as a second time period time (T2) for the loaded cross belt carriage 103a of the looped induction conveyor 103 to travel from the induction point 404 to the common location 406 and arrive traveling at the angular velocity (Vc).

The first time period (T1) for the empty cross belt carriage 102c of the loop sorter 102 to travel from the upstream point 402 to the common location 406 at the constant velocity is given by the formula:

T1=Constant Velocity Distance (Ds)÷Constant Velocity (Vs), wherein

Constant Velocity Distance (Ds)=Actual Distance (D)−Distance traveled by the empty cross belt carriage (D').

The Actual Distance (D) is a distance between the upstream point 402 and the common location 406, and the Distance traveled by the empty cross belt carriage (D') is the distance traversed by the empty cross belt carriage 102c at (Vs) after passing the upstream point 402.

Further, the second time period (T2) for the loaded cross belt carriage 103a of the looped induction conveyor 103 to travel from the induction point 404 to the common location 406 at the angular velocity is given by the formula:

T2=acceleration time (Tc)+constant velocity travel time (Ts), wherein

Acceleration time (Tc)=($V_{final}$−$V_{initial}$)÷linear rate of acceleration (ACC), and, wherein Constant velocity travel time(Ts)=Constant Velocity Distance (Ds)÷Constant Velocity (Vs).

The linear rate of acceleration (ACC) is a constant value equal to 0.3 g, $V_{initial}$=0, $V_{initial}$ is the velocity of the loaded cross belt carriage 103a at the induction point 404, and $V_{final}$=Vc.

For a linear rate of acceleration (ACC) from $V_{initial}$ to $V_{final}$, the distance traveled (D) by the loaded cros belt carriage is the absolute value of ($V_{final}^2$−$V_{initial}^2$)÷(2*ACC), wherein Constant Velocity Distance (Ds)=Actual Distance (D)−Distance traveled by the loaded cross belt carriage (D'), wherein Actual Distance (D) is a distance between the induction point 404 and the common location 406, and Distance traveled by the loaded cross belt carriage (D') is the distance traversed by the loaded cross belt carriage 103a at (Vc) after passing the induction point 404.

The controller, upon determining the first time period (T1) and the second time period (T2), calculates a difference value between the first time period (T1) and the second time period (T2) and compares the difference value to an accepted tolerance level. When the difference value is below the accepted tolerance level, the central controller 302 proceeds with operating the loaded cross belt carriage 103a at angular velocity (Vc) and the empty cross belt carriage 102c at the constant velocity (Vs) allowing the transfer of articles 112 at the curved sections 102b. When the difference value exceeds the accepted tolerance level, the central controller 302 is configured to compute an alignment error between the loaded cross belt carriage 103a and the empty cross belt carriage 102c using the formula:

Alignment error=(T1−T2)*Vs.

According to an example embodiment, when the alignment error exceeds a threshold level, the controller 302 is configured to transmit command signals 320, 324 to the loaded cross belt carriage 103a of the looped induction conveyor 103 to abort the transfer of the article 112 and gradually decelerate from the angular velocity (Vc) to zero. According to another embodiment, when the difference value exceeds the accepted tolerance level or when the alignment error exceeds a threshold level, the controller 302 is configured to transmit command signals 320, 324 to the loaded cross belt carriage 103a of the looped induction conveyor 103 to abort the transfer of the article 112 and gradually decelerate from the angular velocity (Vc) to zero.

An example of the central controller 302 executing the speed matching routine and the time matching routine is given below. The below formulas for executing the speed matching routine and the time matching routine are provided considering a linear acceleration profile for the cross belt carriages, however, a curvilinear acceleration profile may also be considered for executing the speed matching routine and the time matching routine.

In the example below, the radius of the looped induction conveyor ($R_{induct}$)=32 ft., the radius of the loop sorter ($R_{sort}$)=30 ft., and the constant velocity (Vs) of the loop sorter=98 in/s. The angular velocity (Vc) is calculated using the formula:

$Vc=(Vs*(R_{induct})\div(R_{sort})=(98*(32)\div(30)=104.53$ in/s.

The first time period (T1) is calculated using the formula:

$T1$=Constant Velocity Distance ($Ds$)÷Constant Velocity ($Vs$)

The constant velocity (Vs) of the loop sorter=98 in/s.

Constant Velocity Distance ($Ds$)=Actual Distance ($D$)−Distance traveled by the empty cross belt carriage ($D'$).

The Actual distance (D) may be a value provided to the central controller from physical measurements Actual Distance ($D$)=Acceleration time ($Tc$)*Constant velocity ($Vs$)

Acceleration time ($Tc$)=($V_{final}-V_{initial}$)÷linear rate of acceleration (ACC)

In this example, D=137.5 in, D'=0 which indicates that the empty cross belt carriage 102c is approaching the upstream point 402 and has not traveled any distance past the upstream point 402.

Therefore, Acceleration time (Tc)=98÷115.8=0.84 s.
Therefore, Actual Distance (D)=0.84*98=82.93 in.
Therefore Constant Velocity Distance (Ds)=137.50−0=137.50 in.
Therefore first time period T1=137.50÷98=1.403 s.
The second time period (T2) is calculated using the formula:

$T2$=acceleration time ($Tc$)+constant velocity travel time ($Ts$)

Acceleration time ($Tc$)=($V_{final}-V_{initial}$)÷linear rate of acceleration (ACC)

The $V_{initial}$=0, $V_{final}$=Vc=104.53 in/s., and the Linear Rate of Acceleration (ACC) is a constant value equal to 0.3 g which is equal to 115.8 in/s/s.

Acceleration time ($Tc$)=104.53÷115.8=0.903 s.

Further, Constant velocity travel time (Ts)=Constant Velocity Distance (Ds)÷Constant velocity (Vs)

Constant Velocity Distance ($Ds$)=Actual Distance ($D$)−Acceleration Distance ($D'$)

Acceleration Distance ($D$)=($V_{final}^2-V_{initial}^2$)÷(2*ACC).

The $V_{initial}$=0 and $V_{final}$=Vc=104.53 in/s.

Acceleration Distance ($D$)=(104.53$^2$−0$^2$)÷(2*115.8) =47.18 in.

In this example, Actual Distance is a physical measurement, D=100.00 which indicates the distance from induction point 404 to the first point of radial alignment 405.

Constant Velocity Distance ($Ds$)=100.00− 47.18=52.82 in.

Constant velocity travel time ($Ts$) =52.82÷104.53=0.505 s.

Therefore, T2=0.903+0.505=1.405 s and T1=1.403 s.

The difference between the first time period (T1) and the second time period (T2)=(T2)−(T1)=1.405−0.403=0.002 s.

If the accepted tolerance level is less than 10 ms, then the absolute value of (T2)−(T1) must be less than 10 ms. Given that the difference value calculated above is 0.002 s, the central controller allows the transfer of the article from the looped induction conveyor to the loop sorter. As such the central controller computes an alignment error that could occur during the transfer of the article using the formula below.

Alignment error=($T2-T1$)*$Vs$=0.002*98=0.196 in

If the computed alignment error exceeds a threshold level, the controller is configured to transmit a command signal to the loaded cross belt carriage 103a of the looped induction conveyor to abort the transfer of the article and gradually decelerate from the angular velocity (Vc) to zero and await the next empty carriage on 102

FIG. 5 illustrates a diagrammatic plan view of switchyard type induction stations of the looped induction conveyor of FIG. 2, according to an embodiment of the present subject matter. As shown in FIG. 5, the switchyard type induction stations 108a includes one or more induction stations. By way of example, a first induction station is a robotic induction station 502, a second induction station is an operator induction station 504, and a third induction station is a conveyor merge induction station 506. As described above, the velocity (Vc) of empty cross belt carriage 103b returning after successful transfer of the article 112 to the loop sorter 102 may gradually decelerate or accelerate to a velocity appropriate for the switchyard. According to an example embodiment, the looped induction conveyor 103 includes track switches 508 at an entry of the induction stations. The track switches 508 are provided to divert the incoming empty cross belt carriages 103b to their respective induction stations. According to an embodiment, the looped induction conveyor 103 includes track switches 508 at an entry of the induction stations and also at the exit of the induction stations. The track switches 508 are provided at the entry to divert the incoming empty cross belt carriages 103b to their respective induction stations. The track switches 508 are provided at the exit to divert the loaded cross belt carriages 103a from each of the induction stations to common induction point 404. The first induction station 502, second induction station 504, and the third induction station 506 may load the incoming empty cross belt carriages 103b when the velocity of the empty cross belt carriages 103b is approximately zero. However, it is possible, in some embodiments, to load the incoming empty cross belt carriages 103b when the velocity of the empty cross belt carriages 103b are not zero. According to an example embodiment, the velocity of the empty cross belt carriages 103b approaches the zero velocity at the induction point 404. According to another embodiment, the velocity of the empty cross belt carriages 103b approaches the zero velocity at the induction stations. After the empty cross belt carriages 103b are loaded by their respective induction stations, the loaded cross belt carriages 103a are queued at the induction point 404 until the carriages receive a speed control signal 312b from the induction controller 304 to accelerate from the induction point 404. Further, switchyard type induction station 108a may include a scanner 510 at the induction point 404 to scan the articles 112 supported on each of the loaded cross belt carriages 103a upon accelerating from the induction point 404. The scanner 510 may be a barcode scanner configured to capture and decode a barcode affixed on the article 112 in order to extract article information and their respective discharge location at the loop sorter 102. In this manner, each of the loaded cross belt carriages 103*a* are scanned using a single common scanner 510 at the induction point 404 before the carriages transfer the article 112 to the loop sorter 102 at the curved section 102*b*. According to another embodiment, the scanner 510 at the induction point 404 may not be required as the identity of the article 112 may be known before induction.

Figure 6A:
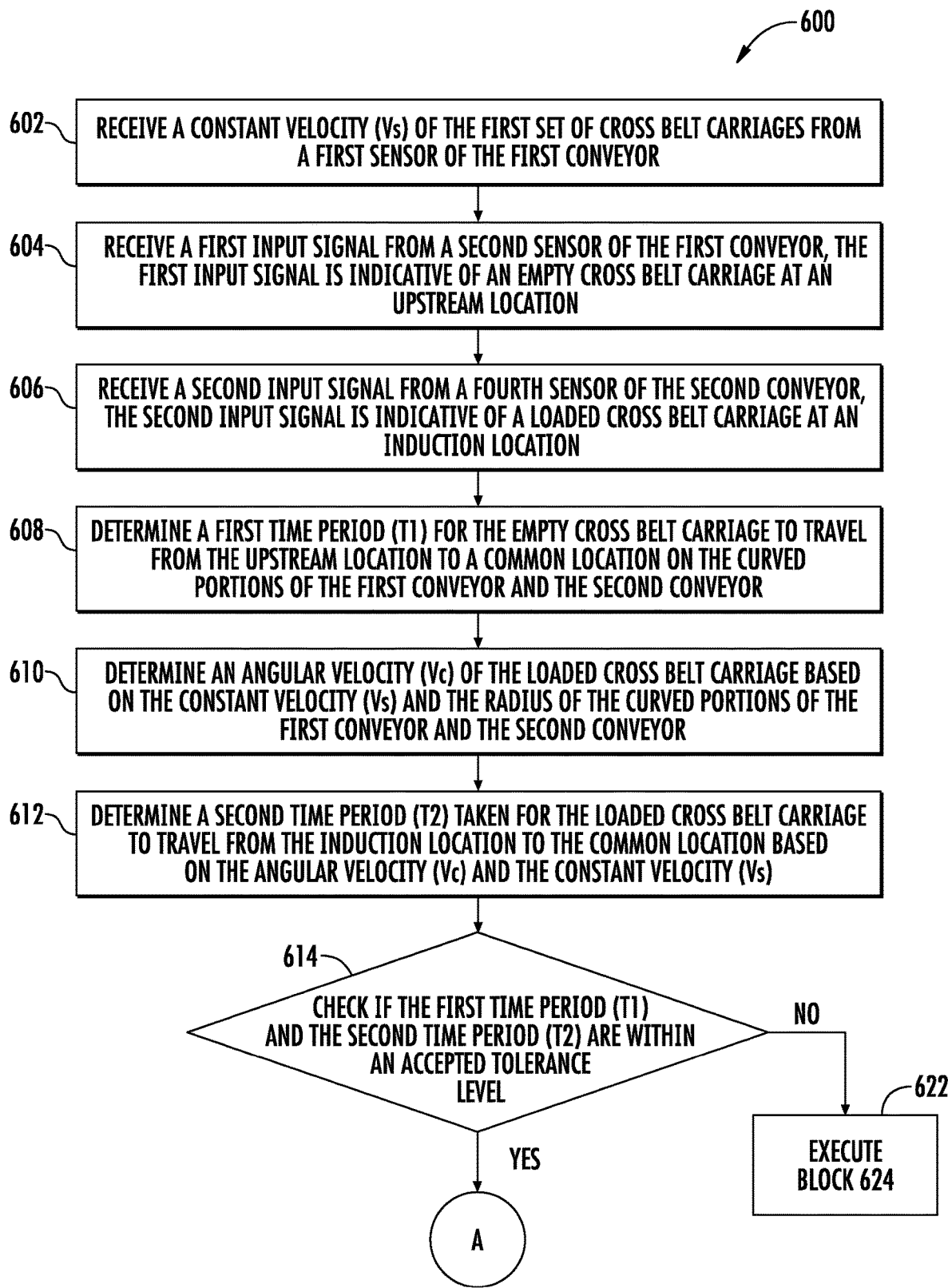
FIGS. 6A and 6B are exemplary flow diagrams illustrating a method for controlling the transfer of articles from the looped induction conveyor to the loop sorter.
Figure 6B:
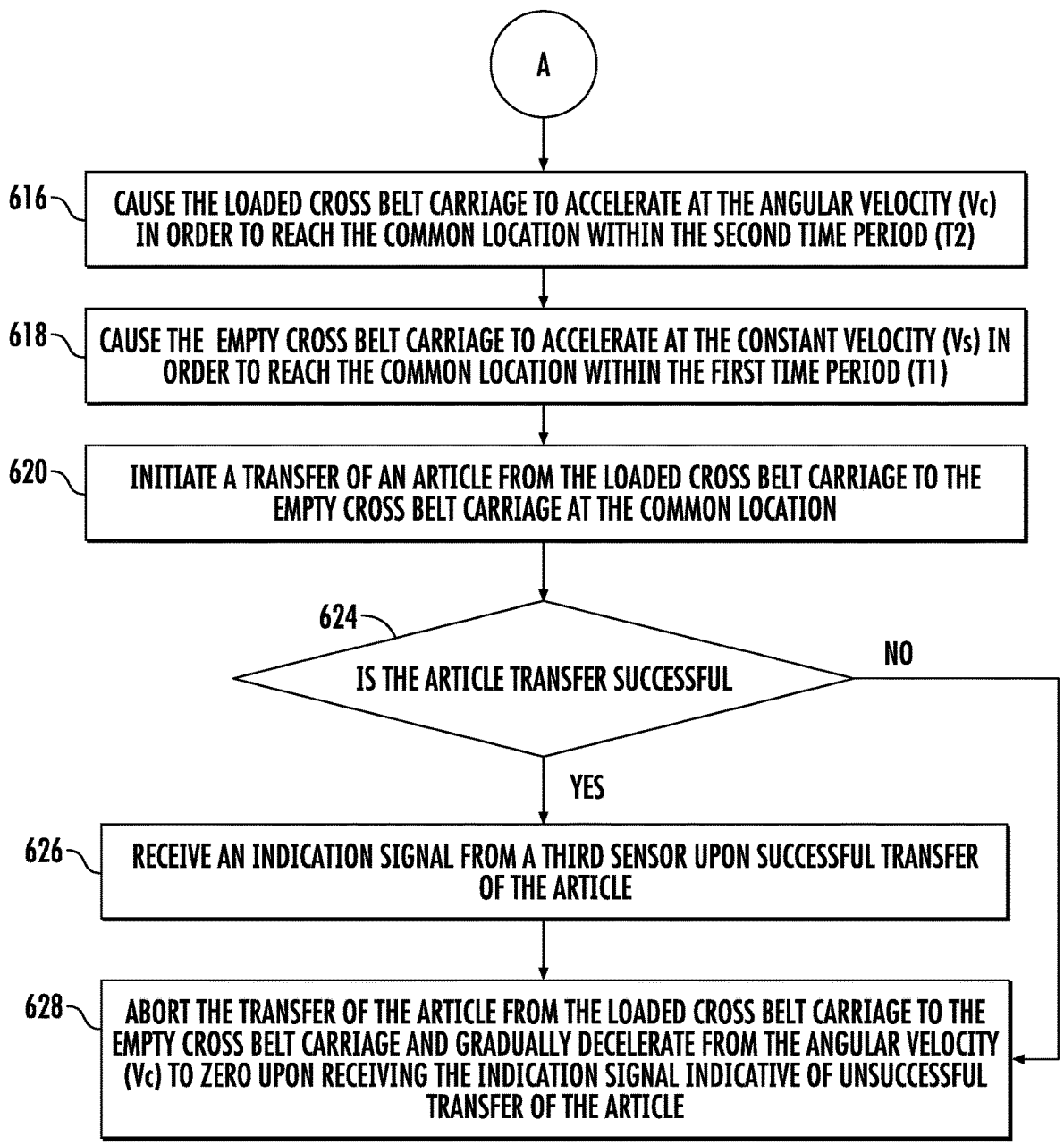

FIGS. 6A and 6B are an exemplary flow diagram illustrating a method for controlling the transfer of articles from the looped induction conveyor to the loop sorter. The order in which the method blocks are described in the flowchart is not included to be construed as a limitation, and some of the described method blocks may be combined in any order to implement the method 600. Additionally, some of the individual blocks may be deleted from the method 600 without departing from the scope of the subject matter described herein.

At step 602, the central controller receives a constant velocity (Vs) of a first set of cross belt carriages 114*a* from a first sensor 306*a* of a first conveyor. According to an example embodiment, the constant velocity may be stored in a memory of the central controller (e.g., so as to be retrievable by one or more of the elements described herein). According to another embodiment, the constant velocity is measured by the first sensor 306*a* in real-time. For example, the first sensor 306*a* may be an encoder communicably coupled to a speed controller. A real-time velocity of the first conveyor (e.g., a loop sorter) may be determined by monitoring the elapsed time between two pulses output by the encoder as an article moves along with the loop sorter.

At step 604, the central controller receives a first input signal from a second sensor of the first conveyor where the first input signal is indicative of an empty cross belt carriage at an upstream location. According to an example embodiment, the second sensor 306*b* is used to detect the leading edge of the cross belt carriage. According to another embodiment, an additional sensor (not shown) may be used along with the second sensor 306*b* to detect the presence of article on the cross belt carriage. For example, the additional sensor may be a photo eye sensor, for example, a photoelectric eye of either visible light, infrared light beams, or other obstruction sensing photoelectric or similar devices known to those skilled in the art. The photo eye sensor includes a photo emitter mounted to one of the side walls at the entrance at an upstream point 402 of the loop sorter 102. A reflector on the side wall opposite the photo eye reflects emitted light back to the photo eye unless the light beam is occluded by an article 112 carrying carriage entering the upstream point 402 of the loop sorter 102. According to another embodiment, any sensor capable of detecting the presence of an article 112 on a cross belt carriage of the loop sorter 102 at the upstream point 402 may also be used instead of a photo eye. For example, outputs from the second sensor 306*b* and the additional sensor may be used to determine whether the cross belt carriage is empty or not. For example, the second sensor 306*b* may detect the leading edge of the cross belt carriage and the additional sensor may monitor the interruptions in the light beam of the photo eye caused by the presence of the article.

According to another embodiment, the second sensor may include two photo eye sensors. For example, one of the photo eye sensors may detect the arrival of a cross belt carriage on the loop sorter by detecting a leading edge of the cross belt carriage or by detecting the license plate of the cross belt carriage. The other photo eye sensor may detect a presence of an article on the cross belt carriage by detecting a leading edge of the article on the cross belt carriage which has interrupted the light beam of the photo eye. In an example embodiment, the two photo eye sensors may be placed in the upstream location and may simultaneously communicate carriage-entry and article-entry signals to the sorter logic controller.

According to yet another embodiment, the second sensor may include one or more cameras for periodically capturing images of the cross belt carriages and transmitting the captured images to the sorter logic controller. The sorter logic controller may process the captured images to identify the empty cross belt carriage and the loaded cross belt carriage.

At step 606, the central controller receives a second input signal from a fourth sensor of the second conveyor where the second input signal is indicative of a loaded cross belt carriage at an induction location. According to an example embodiment, the fourth sensor 304*a* is used to detect the leading edge of the cross belt carriage. According to another embodiment, an additional sensor (not shown) may be used along with the fourth sensor 304*a* to detect the presence of article on the cross belt carriage. For example, the additional sensor may be a photo eye sensor, for example, a photoelectric eye of either visible light, infrared light beams, or other obstruction sensing photoelectric or similar devices known to those skilled in the art. The photo eye sensor, for example, includes a photo emitter mounted to one of the side walls at an induction point 404 linking the switchyard type induction stations 108*a* as shown in FIG. 5. A reflector on the side wall opposite the photo eye may reflect emitted light to the photo eye unless the light beam is occluded by an article 112 carrying carriage entering the induction point 404. According to another embodiment, any sensor capable of detecting the presence of an article 112 on a cross belt carriage of the looped induction conveyor 103 at the induction point 404 may also be used instead of a photo eye. For example, outputs from the fourth sensor 304*a* and the additional sensor may be used to determine whether the cross belt carriage is empty or not. For example, the fourth sensor 304*a* may detect the leading edge of the cross belt carriage and the additional sensor may monitor the interruptions in the light beam of the photo eye caused by the presence of the article. In the absence of any interruption in the light beam, the photo eye sensor may periodically send signals indicative of an empty cross belt carriage 102*c*.

According to another example embodiment, the fourth sensor may include two photo eye sensors. For example, one of the photo eye sensors may detect the arrival of a cross belt carriage on the loop sorter by detecting a leading edge of the cross belt carriage or by detecting the license plate of the cross belt carriage. The other photo eye sensor may detect a presence of an article on the cross belt carriage by detecting leading edge of the article on the cross belt carriage that interrupts the light beam of the photo eye. In an example embodiment, the two photo eye sensors may be placed in the induction location and may simultaneously communicate carriage-entry and article-entry signals to the induction controller.

According to yet another embodiment, the fourth sensor may include one or more cameras for periodically capturing images of the cross belt carriages and transmitting the captured images to the induction controller. The induction controller process the captured images to identify the empty cross belt carriage and the loaded cross belt carriage.

At step 608, the central controller determines a first time period (T1) for the empty cross belt carriage to travel from the upstream location to a common location on the curved portions of the first conveyor and the second conveyor. The common location is determined based on a radius of the curved portions of the first conveyor and the second conveyor. According to an example embodiment, the first time period (T1) is calculated based on formulas provided in conjunction with FIG. 4. According to another embodiment, the first time period (T1) may be provided as a default value to the central controller as the distance from the upstream location to a common location is a known value and the constant velocity is also a known value.

At step 610, the central controller determines an angular velocity (Vc) of the loaded cross belt carriage based on the constant velocity (Vs) and the radius of the curved portions of the first conveyor and the second conveyor. According to an example embodiment, angular velocity (Vc) of the loaded cross belt carriage is calculated based on formulas provided in conjunction with FIG. 4. The angular velocity (Vc) is the velocity at which the loaded cross belt carriage travels from the induction location to the common location. The induction controller accelerates and transmits the loaded cross belt carriage from the induction location to the common location at the angular velocity (Vc). After reaching the common location and after the transfer of the article to the loop sorter, the induction controller may again decelerate the loaded cross belt carriage (Vc) to reach its respective induction station as shown in FIG. 5.

At step 612, the central controller determines a second time period (T2) for the loaded cross belt carriage to travel from the induction location to the common location based on the angular velocity (Vc) and the constant velocity (Vs). The second time period (T2) is calculated based on formulas provided in conjunction with FIG. 4. The first time period (T1) and the second time period (T2) is calculated to determine if the loaded cross belt carriage will reach the common location at the same time that the empty cross belt carriage is expected to reach the common location. For example, the first time period (T1) is expected to be approximately equal to the second time period (T2) for a successful article transfer to occur at the curved sections of the loop sorter and looped induction conveyor. Therefore, the central controller computes the first time period and second time period and compares a difference value of the first time period and second time period to an accepted tolerance level at step 614 to ensure that the article transfer will occur successfully. The central controller calculates the first time period (T1) and second time period (T2) based on the velocity of the empty cross belt carriage and the loaded cross belt carriage and distance to be traversed by the empty cross belt carriage and the loaded cross belt carriage from the induction location or the upstream location to the common location.

Therefore, at step 614, if the difference between the first time period and second time period is within the accepted tolerance level, the central controller, at step 616, causes the loaded cross belt carriage to travel at the angular velocity (Vc) in order to reach the common location within the second time period (T2) and further, at step 618, causes the empty cross belt carriage to travel at the constant velocity (Vs) in order to reach the common location within the first time period (T1). As the empty cross belt carriage and the loaded cross belt carriage reaches the common location, at step 620 the central controller initiates a transfer of the article from the loaded cross belt carriage to the empty cross belt carriage at the common location. Further, at step 614, if the difference between the first time period and second time period is not within the accepted tolerance level, the central controller executes step 624.

At step 624, the central controller determines if the article transfer is successful. If the article transfer is successful, the central controller, at step 626, receives an indication signal from a third sensor of the loop sorter upon successful transfer of the article. If the article transfer is not successful, then the central controller, at step 628, aborts the transfer of the article from the loaded cross belt carriage to the empty cross belt carriage and commands the loaded carriage to return to the switchyard where it will join the queue of loaded carriages and try again.

It will be understood that the foregoing description is of preferred exemplary embodiments of the invention, and that the invention is not limited to the specific forms shown, but is limited only by the scope of the invention as expressed in the appended claims.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Definitions

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

The foregoing description has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its application to thereby enable one of ordinary skill in the art to utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the invention be defined by the claims submitted herewith.

The invention claimed is:

1. A material handling system comprising:
a first conveyor, wherein the first conveyor comprises a first set of cross belt carriages;
a second conveyor, wherein the second conveyor comprises a second set of cross belt carriages positioned adjacent the first set of cross belt carriages, wherein a curved portion of the second conveyor is substantially concentric with a curved portion of the first conveyor; and
a controller in communication with the first conveyor and the second conveyor, wherein the controller is configured to:
receive a constant velocity (Vs) of the first set of cross belt carriages from a first sensor of the first conveyor;
receive a first input signal from a second sensor of the first conveyor, wherein the first input signal is indicative of an empty cross belt carriage from among the first set of cross belt carriages at an upstream location;
receive a second input signal from a fourth sensor of the second conveyor, wherein the second input signal is indicative of a loaded cross belt carriage from among the second set of cross belt carriages located at an induction location on the second conveyor;
determine a first time period (T1) for the empty cross belt carriage to travel from the upstream location to a common location on the curved portions of the first conveyor and the second conveyor, wherein the common location is determined based on a common radius of the curved portions of the first conveyor and the second conveyor;
determine an angular velocity (Vc) of the loaded cross belt carriage based on the constant velocity (Vs) and the radius of the curved portions of the first conveyor and the second conveyor; and
determine a second time period (T2) for the loaded cross belt carriage to travel from the induction location to the common location based on the angular velocity (Vc) and the constant velocity (Vs);
wherein in an instance in which the first time period (T1) and the second time period (T2) are within an accepted tolerance level, the controller is configured to:
cause the loaded cross belt carriage to travel at the angular velocity (Vc) in order to reach the common location within the second time period (T2); and
cause the empty cross belt carriage to travel at the constant velocity (Vs) in order to reach the common location within the first time period (T1);
wherein in an instance in which the loaded cross belt carriage and the empty cross belt carriage reach the common location, the controller is configured to:
initiate a transfer of an article from the loaded cross belt carriage to the empty cross belt carriage at the common location; and
receive an indication signal from a third sensor upon transfer of the article, wherein the indication signal is indicative of one of a successful or unsuccessful transfer of the article.

2. The material handling system as claimed in claim 1, wherein the angular velocity (Vc) of the loaded cross belt carriage is calculated using the formula:

$$Vc=(Vs*\text{radius of second conveyor})\div(\text{radius of first conveyor}).$$

3. The material handling system as claimed in claim 1, wherein the first time period (T1) of the empty cross belt carriage is calculated using the formula:

$T1 = \text{Constant Velocity Distance } (Ds) \div \text{Constant Velocity } (Vs),$ wherein $\text{Constant Velocity Distance } (Ds) = \text{Actual Distance } (D) - \text{Distance traveled by the empty cross belt carriage } (D'),$ wherein the Actual Distance (D) is a distance between the upstream location and the common location, and
wherein the Distance traveled by the empty cross belt carriage (D') is the distance traversed by the empty cross belt carriage at (Vs) after passing the upstream location.

4. The material handling system as claimed in claim 1, wherein the second time period (T2) of the loaded cross belt carriage is calculated using the formula:

$T2 = \text{acceleration time } (Tc) + \text{constant velocity travel time } (Ts),$ wherein $\text{Constant velocity travel time}(Ts) = \text{Constant Velocity Distance } (Ds) \div \text{Constant Velocity } (Vs),$ wherein $\text{Acceleration time } (Tc) = \text{absolute value of } (V_{final} - V_{initial}) \div \text{linear rate of acceleration (ACC)},$ wherein linear rate of acceleration (ACC) is a constant value equal to 0.3 g; $V_{initial} = 0$; $V_{final} = Vc$, wherein For a linear rate of acceleration (ACC) from $V_{initial}$ to $V_{final}$, the Acceleratin Distance traveled (D loaded cross belt carriage is the $(V_{final}^2 - V_{initial}^2) \div (2 * ACC)$, wherein $\text{Constant Velocity Distance } (Ds) = \text{Actual Distance } (D) - \text{Acceleration Distance } (D'),$ wherein
Actual Distance (D) is a distance between the induction location and the common location, and wherein
Acceleration Distance traveled by the loaded cross belt carriage (D') is a distance traversed by the loaded cross belt carriage while accelerating from Vinitial to.

5. The material handling system as claimed in claim 1, wherein the first conveyor is a loop sorter and the second conveyor is a looped induction conveyor with switchyard type induction stations.

6. The material handling system as claimed in claim 5, wherein each of the induction stations receives one of the empty cross belt carriage or the loaded cross belt carriage of the second conveyor.

7. The material handling system as claimed in claim 5, wherein the controller is configured to assign one or more cross belt carriages from the second set of cross belt carriages to each of the induction stations such that the second set of cross belt carriages are loaded with articles, wherein the velocity of each of the one or more cross belt carriages at the induction stations is approximately zero.

8. The material handling system as claimed in claim 5, wherein each induction station includes one of a robotic induction station, an operator induction station, or a conveyor merge induction station.

9. The material handling system as claimed in claim 1, wherein the first sensor is one of a motion detector, an encoder, or a resolver.

10. The material handling system as claimed in claim 1, wherein the second sensor, the third sensor, and the fourth sensor are each one of a photo eye sensor, a laser sensor, or a camera.

11. The system as claimed in claim 1, wherein the accepted tolerance level is calculated based on a difference between the first time period (T1) and the second time period (T2), and wherein the accepted tolerance level ranges from 0 to 100 milliseconds based on the speed of the loop sorter.

12. The material handling system as claimed in claim 11, wherein in an instance in which the difference exceeds the accepted tolerance level, the controller is configured to compute an alignment error between the loaded cross belt carriage and the empty cross belt carriage using the formula:

$\text{Alignment error} = (T1 - T2) * Vs.$

13. The material handling system as claimed in claim 11, wherein in an instance in which the difference exceeds the accepted tolerance level or the alignment error exceeds a threshold level, the controller is configured to transmit a command signal to the loaded cross belt carriage of the second conveyor to abort the transfer of the article and gradually decelerate from the angular velocity (Vc) to zero.

14. A method for operating a material handling system, the method comprising:
receiving a constant velocity (Vs) of a first set of cross belt carriages from a first sensor of a first conveyor;
receiving a first input signal from a second sensor of the first conveyor, wherein the first input signal is indicative of an empty cross belt carriage from among the first set of cross belt carriages at an upstream location;
receiving a second input signal from a fourth sensor of a second conveyor, wherein the second input signal is indicative of a loaded cross belt carriage from among a second set of cross belt carriages located at an induction location on the second conveyor;
determining a first time period (T1) for the empty cross belt carriage to travel from the upstream location to a common location on the curved portions of the first conveyor and the second conveyor, wherein the common location is determined based on a radius of a curved portion of the first conveyor and a curved portion of the second conveyor;
determining an angular velocity (Vc) of the loaded cross belt carriage based on the constant velocity (Vs) and the radius of the curved portions of the first conveyor and the second conveyor; and
determining a second time period (T2) for the loaded cross belt carriage to travel from the induction location to the common location based on the angular velocity (Vc) and the constant velocity (Vs);
wherein in an instance in which the first time period (T1) and the second time period (T2) are within an accepted tolerance level:
causing the loaded cross belt carriage to travel at the angular velocity (Vc) in order to reach the common location within the second time period (T2); and
causing the empty cross belt carriage to travel at the constant velocity (Vs) in order to reach the common location within the first time period (T1);
wherein in an instance in which the loaded cross belt carriage and the empty cross belt carriage reach the common location:

initiating a transfer of an article from the loaded cross belt carriage to the empty cross belt carriage at the common location; and receiving an indication signal from a third sensor upon transfer of the article, wherein the indication signal is indicative of one of a successful or unsuccessful transfer of the article.

15. The method as claimed in claim 14, further comprising:

aborting the transfer of the article from the loaded cross belt carriage to the empty cross belt carriage and gradually decelerating from the angular velocity (Vc) to zero upon receiving the indication signal indicative of unsuccessful transfer of the article.

16. The method as claimed in claim 14, further comprising:

assigning one or more cross belt carriages from the second set of cross belt carriages to switchyard type induction stations such that the second set of cross belt carriages are loaded with articles from each induction station, wherein the velocity of the one or more cross belt carriages at the induction stations is approximately zero.

17. The method as claimed in claim 14, wherein the curved portion of the second conveyor is substantially concentric with the curved portion of the first conveyor.

18. A non-transitory processor readable medium having stored thereon processor-executable instructions configured to cause a controller to:

receive a constant velocity (Vs) of a first set of cross belt carriages from a first sensor of a first conveyor;

receive a first input signal from a second sensor of the first conveyor, wherein the first input signal is indicative of an empty cross belt carriage from among the first set of cross belt carriages at an upstream location;

receive a second input signal from a fourth sensor of a second conveyor, wherein the second input signal is indicative of a loaded cross belt carriage from among a second set of cross belt carriages located at an induction location on the second conveyor;

determine a first time period (T1) for the empty cross belt carriage to travel from the upstream location to a common location on the curved portions of the first conveyor and the second conveyor, wherein the common location is determined based on a radius of the curved portions of the first conveyor and the second conveyor;

determine an angular velocity (Vc) of the loaded cross belt carriage based on the constant velocity (Vs) and the radius of the curved portions of the first conveyor and the second conveyor; and determine a second time period (T2) for the loaded cross belt carriage to travel from the induction location to the common location based on the angular velocity (Vc) and the constant velocity (Vs);

wherein in an instance in which the first time period (T1) and the second time period (T2) are within an accepted tolerance level:

cause the loaded cross belt carriage to travel at the angular velocity (Vc) in order to reach the common location within the second time period (T2); and cause the empty cross belt carriage to travel at the constant velocity (Vs) in order to reach the common location within the first time period (T1);

wherein in an instance in which the loaded cross belt carriage and the empty cross belt carriage reach the common location:

initiate a transfer of an article from the loaded cross belt carriage to the empty cross belt carriage at the common location; and receive an indication signal from a third sensor upon transfer of the article, wherein the indication signal is indicative of one of a successful or unsuccessful transfer of the article.

19. The non-transitory processor readable medium as claimed in claim 18, wherein the stored processor-executable instructions are configured to cause the controller to:

abort the transfer of the article from the loaded cross belt carriage to the empty cross belt carriage and gradually decelerate from the angular velocity (Vc) to zero upon receiving the indication signal indicative of unsuccessful transfer of the article.

20. The non-transitory processor readable medium as claimed in claim 18, wherein the stored processor-executable instructions are configured to cause the controller to:

assign one or more cross belt carriages from the second set of cross belt carriages to switchyard type induction stations such that the second set of cross belt carriages are loaded with articles from each induction station, wherein the velocity of the one or more cross belt carriages at the induction stations is approximately zero.

* * * * *